April 6, 1954  E. P. CARTER  2,674,729
MEASURING APPARATUS
Filed April 13, 1950  3 Sheets-Sheet 1

INVENTOR
Elbert P. Carter
BY Kenway Jenney
Witter & Hildreth
Atty.

Patented Apr. 6, 1954

2,674,729

UNITED STATES PATENT OFFICE 2,674,729

MEASURING APPARATUS

Elbert P. Carter, Wayland, Mass., assignor, by mesne assignments, to Edward G. Martin, Cambridge, Mass.

Application April 13, 1950, Serial No. 155,767

7 Claims. (Cl. 340—200)

The present invention relates to measuring apparatus and is more particularly concerned with apparatus functioning in the manner of self-synchronous devices. As is well known self-synchronous devices are ordinarily used to produce electrical signals as a function of angle. The apparatus of the present invention is similarly useful and may be employed wherever an electrical signal as a function of a precision measurement is required.

Conventional self-synchronous devices are limited to accuracies of about five minutes of arc. These limitations are largely due to the relatively small number of physical angular divisions and to the variations in magnetic coupling because of the required use of a ferromagnetic core. In addition there are the usual mechanical inaccuracies such as may rise, for example, from eccentricity of the rotor mounting and the like.

The principal object of the present invention is to provide a measuring device which is inherently of high accuracy and which avoids the difficulties of the conventional self-synchronous devices.

With this object in view, the present invention comprises a pair of non-magnetic discs coaxially mounted and separated by a short air gap. One disc is rotatable, while the other is stationary. On the opposing faces of the discs are annular deposits of metal, each deposit being divided into two or more sections by a gridwork of lines etched through the metal deposit and into the disk material. A source of high frequency voltage is connected between the sections of one of the disks, inducing, by capacitive action, a voltage between the sections of the second disk. The angular position of the rotating disk can be determined by measuring this induced voltage.

The present invention eliminates most of the errors inherent in conventional self-synchronous devices. Since it operates by capacitive action it requires no ferromagnetic material, hence it avoids the errors inherent in the use of such material. Very fine gridworks can be etched in the deposited metal, thus giving a large number of angular divisions. The effects of mechanical inaccuracies are minimized because the many angular divisions produce a total output which is independent of mechanical inaccuracies in the individual divisions.

An important feature of the invention is that both "coarse" and "fine" angular measurements may be simultaneously obtained with a single set of equipment.

Other features comprise certain combinations and arrangements of parts hereinafter described and particularly defined in the claims.

Figure 1:
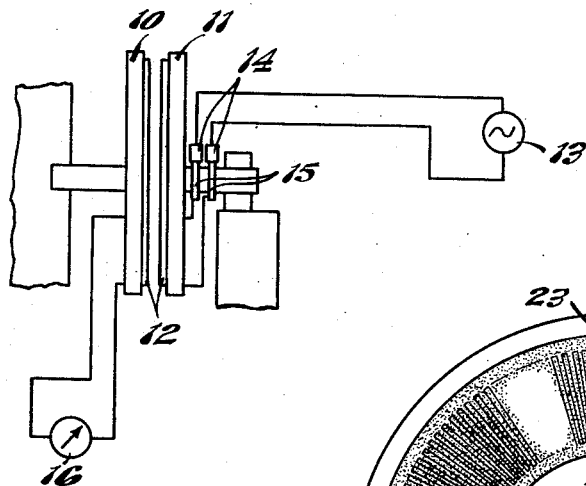
Figure 2:
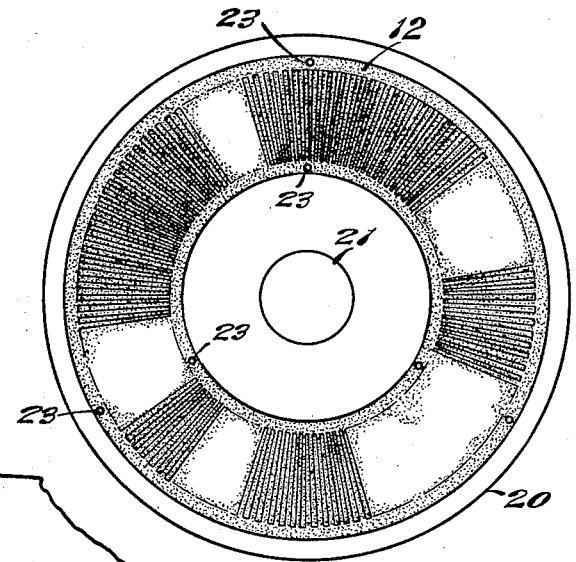
Figure 3:
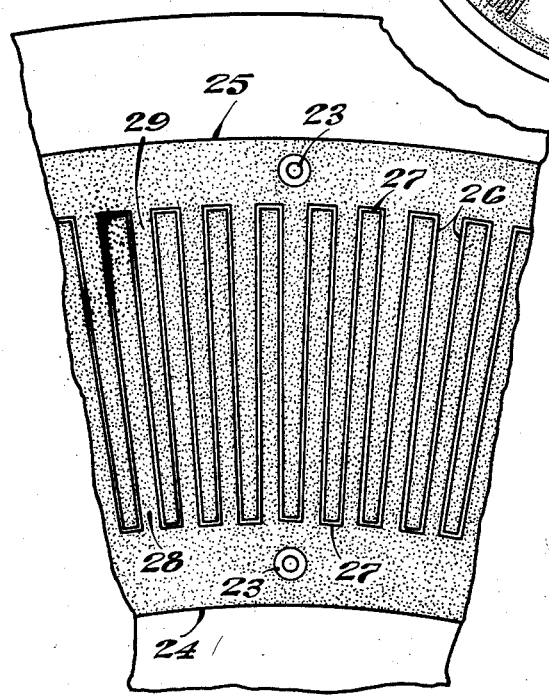
Figure 4:
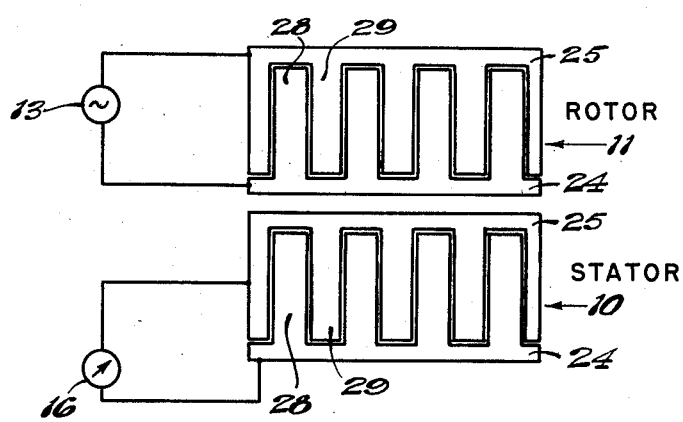
Figure 5:
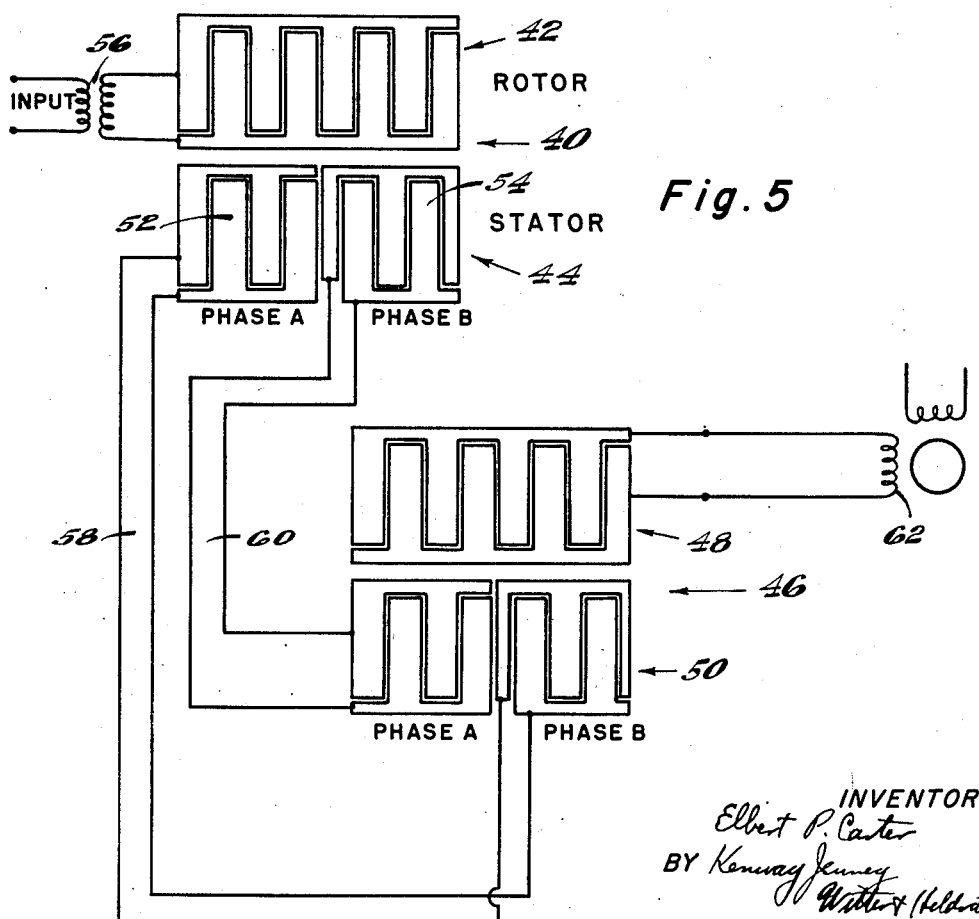
Figure 6:
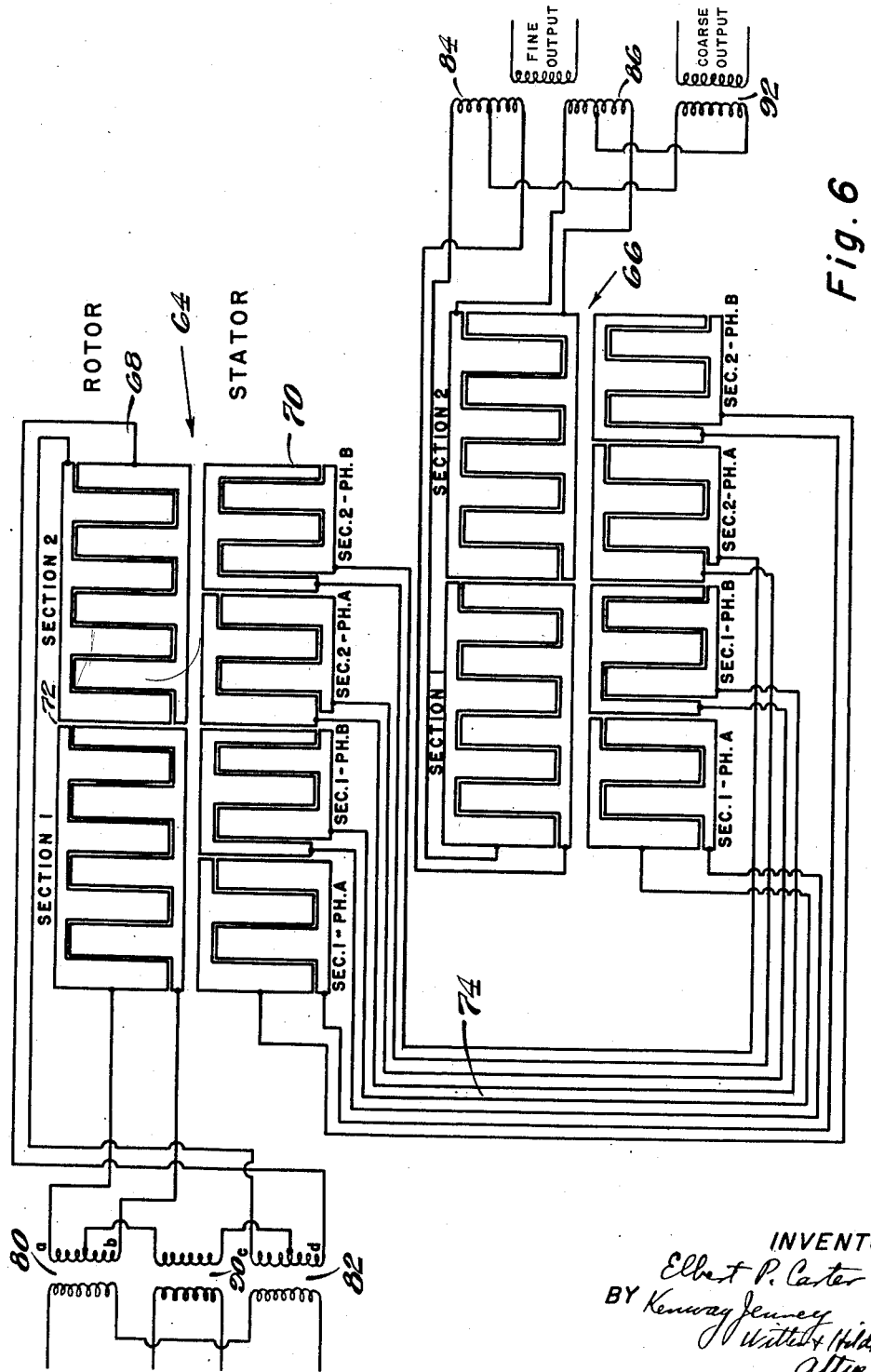

In the accompanying drawings Fig. 1 is an elevation of the preferred form of the invention; Fig. 2 is a front elevation of one of the disks; Fig. 3 is an enlarged view of a part of the disk shown in Fig. 2; Fig. 4 is a schematic diagram of a simple form of angular measuring device according to the present invention; Fig. 5 is a diagram of a data-transmission system embodying the present invention; and Fig. 6 is a diagram of a data-transmission capable of "multi-speed" or coarse and fine transmission of information.

In the structure of Fig. 1, the stator 10 and the rotor 11 are mounted facing each other across a narrow air gap. The rotor and stator are circular in shape and are made of non-magnetic material, preferably glass. On the inner faces of rotor and stator are annular deposits of metal 12, which are divided into portions by the etched lines to be hereafter described. A high frequency source 13 is connected to the brushes 14, which bear on the slip rings 15. These rings are in turn connected to the several portions of the metal deposit on the rotor. By capacitive coupling between the stator and rotor, a signal is developed between the sections of the stator. The strength of this signal may be measured by any suitable means illustrated diagrammatically by the alternating-current voltmeter 16.

The stator and rotor are similar in construction. This is shown in Fig. 2, which illustrates the general construction of each. The disk 20 is mounted on the shaft 21. The ring of metal 12, preferably silver, is deposited on the surface of the disk. Lines are etched in this ring, as will be explained in connection with Fig. 3. Holes 23 are drilled in the disk to provide passages for lead wires to connect with the metallic deposit.

Fig. 3 is an enlarged view of a part of the ring 12 of metal on the disk. The deposit is indicated by stippling. It is divided by etched or engraved lines into two portions or "electrodes," namely an inner electrode 24 and an outer electrode 25. The term "electrodes" is appropriate since the two portions of the deposit on each disk form condenser electrodes or plates which interact in a manner to be presently described. The radial lines 26 are arranged at equal angular intervals. As an example of the spacing, there are 720 of these radial lines, dividing the annulus into 720 equal segments, each covering an angle of 30 min. The radial lines are alternately connected at their inner and outer ends by short arcs or chords 27. The etched lines 26 and 27 are connected in "series," whereby the electrodes 24 and 25 have a large number of interleaved fingers 28 and 29. The fingers of each electrode are electrically connected together, but the two electrodes are separated from each other by the etched lines. The holes 23 extend through the disk to permit the attachment of lead wires to the two electrodes.

The operation of the apparatus of Fig. 1 can best be understood by referring to the schematic diagram of Fig. 4. In this diagram the rotor annulus 11 and the stator annulus 10 are shown in developed form for simplicity of explanation. Furthermore each electrode 24, 25 is shown as having only four fingers. The high frequency voltage source 13 is connected across the rotor electrodes 24 and 25, and the measuring instrument is connected across the corresponding stator electrodes, also numbered 24 and 25. With the rotor and stator in the relative positions shown in Fig. 4, the capacitance between the upper electrodes 25 of the rotor and stator is at a maximum. At the same time, the capacitance between the lower electrodes 24 of the rotor and stator is also at a maximum. Hence the reading of the meter 16 is a maximum. If the rotor is moved relative to the stator the meter reading decreases, passes through a minimum when the etched lines of each member lie midway between the lines of the other member, and then increases once more to the maximum. Stated in another way, as shown in Fig. 4, the fingers 29 of both rotor and stator are opposite each other, and likewise for the fingers 28. Upon movement of the rotor through the distance between two lines, a finger 29 of the stator will oppose a finger 28 of the rotor. Since the instrument 16 is not direction-sensitive, the readings for these two conditions will be the same, or substantially so. At the half-way point, the fingers 28 and 29 of the stator are substantially equally disposed with respect to the stator and are hence at substantially equal potentials, whereby the meter will read zero (or nearly, if not exactly, zero, because of asymmetry due to the inner and outer bands).

In cases where direction-sensitivity is required, it can be attained by means to be described later. However, in use as an accurate angular measuring device, it is only necessary to watch the variations in the reading of the voltmeter. One can thus determine the angle through which the rotor turns. Each fluctuation of the voltage between the minimum and maximum indicates a rotation through half the angle between two adjacent etched lines. The magnitude of the A. C. voltage is an indication of the relative positions of the rotor lines and the stator lines. By accurate voltage measurements it is possible to determine the rotor position to within 1/1000 of the angle between two adjacent lines. Hence if the angle between lines is 30 min., the device is accurate to within 2 seconds of arc.

Fig. 5 illustrates the adaptation of the present invention to a data-transmission system. In Fig. 5 there is a transmitter 40 having two members (rotor and stator) 42 and 44, and a receiver 46 having two corresponding members 48 and 50. The stators and rotors of the two pieces of equipment are identical, and a description of only one will suffice. As in Fig. 4, the windings are shown in developed form, with a greatly reduced number of fingers.

The rotor 42 is of the same form as in Fig. 4, but the stator is divided into separate phases 52 and 54 offset by half the line pitch. The phases are also designated A and B. Thus in the position shown in Fig. 5 the fingers of phase 52 are in alignment with fingers of the rotor 42, while the fingers of phase 54 are displaced with respect to the rotor by half the pitch of the lines. The rotor 42 is energized from any suitable high-frequency source indicated as a transformer 56 having its secondary connected to the rotor electrodes.

The transmitter 48 has its stator phases A and B connected by wires 58 and 60 respectively with the separate phases B and A of the receiver stator. The output of the rotor is indicated as an "error signal" since the amplitude of the output is a function of the angular difference between the rotors 42 and 48. The voltage is indicated by a device 62 which is preferably phase-sensitive. An example of a suitable phase-sensitive device is a two-phase motor, of which one phase is excited by the error signal, while the other phase is excited with a constant reference voltage at the same frequency as the input. It can be shown that such motor when used with the system of Fig. 5 is responsive not only to the magnitude of angular separation between the rotors, but also to direction, i. e. whether rotor 48 lags or leads rotor 42. The motor may then be used to drive the rotor 48 in accordance with usual principles of servomechanisms, whereby the rotors may be maintained at all times in substantial correspondence.

The crossing of the phases, whereby phase A of one rotor is connected to phase B of the other gives zero error signal for similar positioning of the rotors, but other useful interconnections may be used, as will be understood by those familiar with the servo art; e. g., if the connections are A to A and B to B, a zero signal is given when one rotor is displaced from the other by half a finger.

A further modification is shown in Fig. 6. This comprises a data-transmission system which is not only direction-sensitive, but which is capable of "coarse" and "fine" operation, sometimes referred to as "low-speed" and "high-speed." By this means, it is possible to obtain in a single system two simultaneous error signals, one being a "fine" signal in which the range between two maxima is the width of one finger, as heretofore described, and the other a "coarse" signal in which the range between two maxima corresponds to a half revolution.

The transmitter 64 and the receiver 66 have each a rotor 68 and stator 70, similar to corresponding parts of Fig. 5, except that each rotor is divided into two separate sections, each extending over 180°, and separated by an etched line 72, and each rotor is divided into two sections, each section being further divided into two phases. The sections of each rotor are designated sections 1 and 2, while the portions of the stator carry both section and phase designations. It will be observed that in the developed views, section 1 of the rotor and the two phases A and B of section 1 of the stator appear identical with the entire rotor and stator of Fig. 5. Section 2 is identical with section 1 for both rotor and stator. (In actual construction, of course, each "section" of Fig. 6 spans only 180°, whereas the corresponding parts of Fig. 5 span the full 360°.) The stators of the transmitter and receiver are connected by wires 74. For best operation as a data-transmission system, the phases are connected as shown in Fig. 6; namely:

1A of the transmitter to 2B of the receiver
1B of the transmitter to 1A of the receiver
2A of the transmitter to 1B of the receiver
2B of the transmitter to 2A of the receiver The apparatus is excited by two inputs. The "high-speed" or "fine" input comprises two transformers 80 and 82 with their secondaries independently connected across the finger areas of sections 1 and 2 of the rotor of the transmitter. Before describing the second input, I refer to the "fine" output comprising a transformer having two primaries 84 and 86 independently connected across the finger areas of sections 1 and 2 of the rotor of the receiver. The single secondary 88 has an output voltage dependent on the rotor positions. The operation is identical with that of Fig. 5, so far as fine control is concerned, since the two "sections" of the stators and rotors are excited similarly to the single sections of Fig. 5.

A second input is provided by a transformer 90 having the ends of its secondary connected to the mid-points of the secondaries of transformers 80 and 82. For the present it will be convenient to assume that the second input, which will be referred to as the "coarse" or "low-speed" input, is at a different frequency; therefore, the ends $a$ and $b$ of the secondary of transformer 80 are at substantially the same potential, and this means that both finger areas of section 1 of the rotor are at a uniform potential. The same applies to ends $c$ and $d$ of 82, hence both finger areas of section 2 are at a uniform potential, which, however, differs from that of section 1.

The coarse output is obtained by means of an output transformer 92 having its primary connected to the mid-points of the primaries of transformers 84 and 86, while its secondary is connected to any suitable output device. Its output voltage is at the "coarse" frequency, and the voltage is dependent on the relative rotor positions.

The output voltages at 88 and 92 are direction-sensitive and may be utilized in any suitable manner, as will be understood by those familiar with the servo art.

While the two inputs are described above as being at two different frequencies, it will be observed that they may be at the same frequency, in which case a single primary may be substituted for the three primary windings shown for the input transformers 80, 82 and 90. From principles of linear superposition, it is apparent that the outputs will be separate voltages as functions of the "coarse" and "fine" measurements of relative positions of the rotors. For example, with 720 lines the fine measurement gives a full range from maximum to maximum for a motion of 30 min. Since this measurement alone gives no indication of the particular 30-minute sector in which the rotors may be disposed, the coarse measurement is utilized to determine the general position; the coarse measurement also prevents the rotors from slipping into another 30-minute sector under shock or transient stress.

The principles of coarse and fine control are well understood by those skilled in the servo-mechanism art. The present invention has the advantage of giving independent coarse and fine outputs with single equipment.

It will be understood that the diagrams of Figs. 4 to 6 show a greatly reduced number of fingers for ease of explanation, but that in practice the number of fingers will be as great as possible, since the fineness of measurement is thereby increased. The deposits will also, of course, be arranged on a disk or drum, in order that relative angular displacements may be measured. Although particular embodiments of the invention have been described, it will be understood that the invention is not limited thereto, but in its broader aspects comprehends the precise measurement of angle by capacitance variations between electrodes on relatively movable parts, and the invention is not to be construed as limited to the embodiments illustrated and described herein.

Having thus described the invention, I claim:

1. Apparatus for measuring angles, comprising two relatively rotatable members, having planar faces, opposing each other across an air gap and bearing on their opposing faces deposits of metal divided into electrodes having a large number of interlaced finger areas and each electrode opposing a corresponding electrode of the other member, a source of high frequency electrical energy connected between the electrodes of one of the members, and means for detecting electrical potential differences between the electrodes of the other member.

2. Apparatus for measuring angles, comprising two relatively rotatable members, having planar faces, opposing each other across an air gap and bearing on their opposing faces deposits of metal divided into electrodes having a large number of interlaced finger areas and each electrode opposing a corresponding electrode of the other member, a source of alternating voltage connected between electrodes of one member, the relative angular position between members determining capacitance variations between electrodes of the opposed members, and electrical measuring means connected to the other member for determining the relative angular position of the members.

3. Apparatus for measuring angles, comprising two non-conducting disks, a rotor and a stator, opposing each other across an air gap and bearing on their opposing faces annular deposits of conducting material divided into electrodes by a large number of radial lines through the material at equal angular intervals around the annulus, said radial lines being alternately connected at their inner and outer ends by tangential lines, a source of high frequency electrical energy connected between the electrodes of one of the disks, and means for detecting electrical potential differences between the electrodes of the other disk.

4. Data-transmission apparatus comprising a transmitter and a receiver, each consisting of two relatively rotatable members of non-conducting material, opposing each other across an air gap and bearing on their opposing faces deposits of metal divided by lines cutting the metallic deposit into electrodes, a source of high frequency electrical energy connected between the electrodes of one of the members of the transmitter, electrical connections between corresponding electrodes of the transmitter and of the receiver, direction-sensitive electrical indicating means connected between the electrodes of the other member of the receiver to give a measurement of the amount and direction of the relative displacement of the rotors.

5. Data-transmission apparatus comprising a transmitter and a receiver, each consisting of two disks, opposing each other across an air gap and bearing on their opposing faces annular deposits of metal divided into inner and outer sections by radial lines at equal angular intervals, said lines being alternately connected at their inner and outer ends by tangential etched lines, the rotor annuli being divided into halves by a diametric etched line and the stator annuli being divided into quadrants by two diametric etched lines, the radial lines in alternate quadrants being offset by half the angle between adjacent radial lines, a source of high frequency electrical energy connected between the inner and outer sections of the transmitter rotor, electrical connections between the sections of the transmitter stator and the corresponding sections of the receiver stator, and electro-mechanical means connected between the sections of the receiver rotor to rotate the receiver rotor in unison with the transmitter rotor.

6. Data-transmission apparatus comprising a transmitter and a receiver, each having two non-magnetic members, a stator and a rotor, each of the members of the transmitter and receiver having opposed electrodes in which the capacitive relationship varies with relative rotation between rotor and stator, one of the members of both transmitter and receiver having electrodes in at least two phases whereby the variations in capacitance occur as different functions of rotation, means connecting the electrodes of one transmitter member to the electrodes of one receiver member, a source of alternating current energy for the electrodes of the other transmitter member, and an output device for the receiver, which indicates the direction and amount of the electric output from the electrodes of the other receiver member.

7. Apparatus for measuring angles, comprising two relatively movable members of non-conducting material, one of the members having two electrodes having interlaced finger areas which are uniformly spaced, the other member having two phases, each with interlaced finger areas having the same spacing as in said first-named member but with the finger areas of the phases offset from one another.

References Cited in the file of this patent

UNITED STATES PATENTS

| Number | Name | Date |
|---|---|---|
| 1,647,474 | Seymour | Nov. 1, 1927 |
| 1,909,079 | Steerup | May 16, 1933 |
| 2,116,080 | Parker | May 3, 1938 |
| 2,219,497 | Stevens | Oct. 29, 1940 |
| 2,250,069 | Severy | July 22, 1941 |
| 2,400,112 | Greibach | May 14, 1946 |
| 2,402,603 | Clark | June 25, 1946 |

OTHER REFERENCES

Publication, Wireless World, December 1949, pp.10–12, 175–41.